United States Patent [19]

McClellan et al.

[11] Patent Number: 5,735,341
[45] Date of Patent: Apr. 7, 1998

[54] PRIMARY DIVIDER PLATE

[75] Inventors: Harold G. McClellan, Cambridge; William G. Schneider, Branchton, both of Canada

[73] Assignee: The Babcock & Wilcox Company, New Orleans, La.

[21] Appl. No.: 749,590

[22] Filed: Nov. 15, 1996

Related U.S. Application Data

[63] Continuation of Ser. No. 509,906, Aug. 1, 1995, Pat. No. 5,623,763.

[51] Int. Cl.$^6$ .................................. F28F 7/00; F28F 5/22
[52] U.S. Cl. ........................ 165/81; 165/158; 165/174
[58] Field of Search ........................ 165/81, 155, 174, 165/176

[56] References Cited

U.S. PATENT DOCUMENTS

| | | | |
|---|---|---|---|
| 1,869,236 | 7/1932 | Baumann | 165/81 X |
| 2,919,906 | 1/1960 | Haight | 162/176 X |
| 4,200,061 | 4/1980 | Sterk et al. | 165/158 X |
| 4,345,549 | 8/1982 | Colmano | 165/158 X |
| 4,422,499 | 12/1983 | Batistoni | 165/158 X |
| 4,769,209 | 9/1988 | Tower et al. | 165/158 X |

*Primary Examiner*—Leonard R. Leo
*Attorney, Agent, or Firm*—Daniel S. Kalka; R. J. Edwards

[57] ABSTRACT

A one-piece curved floating primary divider plate (40) is described which is suitable for retrofit in an existing steam generator. The one-piece curved floating primary divider plate eliminates most loose parts and reduces leakage of the primary flow resulting in an improvement in the thermal performance of a steam generator. A method of retrofitting a primary divider plate in an existing steam generators is also described to improve the thermal performance of the steam generator.

9 Claims, 6 Drawing Sheets

PRIMARY DIVIDER PLATE

This is a continuation of application Ser. No. 08/509,906 filed Aug. 1, 1995, now U.S. Pat. No. 5,623,763.

BACKGROUND OF THE INVENTION

1. Field of the Invention

The present invention relates in general to primary divider plates for recirculating steam generators, and in particular to a method for replacement of a primary divider plate and a new floating one-piece curved replacement divider plate.

2. Description of the Related Art

In nuclear power stations, steam generators, such as recirculating steam generators and once-through steam generators, are used for heat exchange purposes in the generation of steam to drive the turbines. This application relates to recirculating steam generators. Primary fluid which is heated by the core of the nuclear reactor passes through the primary head (10) as shown in FIG. 1 through a bundle of U-shaped tubes (4) in a recirculating steam generator (2). In the construction of a steam generator, the primary head (10) is welded to the tubesheet (8) of a recirculating steam generator. In the United States, the term "primary head" is often referred to as "channel cover". Secondary fluid, normally water, which is fed into the space surrounding the tubes receives heat from the tubes and is converted into steam for driving the turbines. After cooling and condensation has occurred, the secondary fluid is directed back into the space around the tubes to provide a continuous steam generation cycle.

In the primary head (10) of the steam generator (2) there is normally one or two inlets (12) and one or two outlets (16) for the primary fluid with a divider plate (14) separating the inlet (12) from the outlet (16) to direct the flow of the primary fluid up through one side of the U-shaped tubes where the primary fluid rises in the tubes and turns in the U-shaped tubes and then exits from the outlet (16). The primary fluid is pumped through the system to return to the reactor where it is heated once again. The primary divider plate (14) provides a means for directing the flow of the primary fluid through the tubes (4) of the steam generator (2) as well as separates the heated inlet flow of the primary fluid in the primary head (10) from the "cooled" outlet flow.

In Canada, the steam generators referred to as CANDU steam generators have tighter space constraints than those employed in the United States. The CANDU steam generators usually employ heavy water ($D_2O$) as the primary fluid. In the United States, the primary fluid is water. The primary fluid causes erosion of the divider plate. Erosion damage to the primary divider plate has generated concerns over loose parts potential and thermal performance degradation of the steam generator.

FIG. 2 shows in a frontal sectional view a segmented bolted primary divider plate. The divider plate is positioned in approximately the middle of the primary head and acts as a full partition or a baffle. The individual segments or plates (18) that make up the primary divider plate are inserted through a manway, which is an opening to provide access to the primary head with the opening being approximately 14 inches×18 inches. The segments (18) are fastened to each other usually with fasteners (19), for example, by being bolted together. The segments (18) are positioned on tubesheet and primary head seat bars and clamped together with a clamping dog also referred to as a clamping block (20). Experience has shown that the primary fluid erodes the fasteners as well as the area around them and can cause loose pieces to fall off. This can cause damage to the primary heat transport pump and line and can present problems in a loss of cooling accident (LOCA) by shedding loose parts due to the shock wave which results during this type of accident. A rapid change in pressure of the fluid forms the shock wave which can cause the divider plate to break apart and cause damage in the primary head and system downstream.

Another primary divider plate design that has been used in Canada is the one-piece floating welded divider plate (22) shown in cross sectional view in FIG. 3. The one-piece floating welded divider plate (22) includes a main portion of the divider plate (24) which is positioned in the primary head (10) on a seat bar (26) during fabrication and prior to welding the primary head (10) to the tubesheet (8). The one-piece floating welded divider plate (22) has a flat construction and is supported at its edges by the primary head seat bar (26) which is a tongue-in-groove joint received in the groove (24a) at one end and by a channel (28) in the tubesheet (8), or alternatively, a tubesheet seat bar (27) at the other end. The tubesheet seat bar (27) is of a similar construction as the primary head seat bar (26). The one-piece floating welded divider plate is installed in the fabrication process of new steam generators by positioning the main portion (24) of the divider plate into the primary head (10) onto the seat bar (26) prior to welding the primary head to the tubesheet (8). After the primary head (10) is welded to the tubesheet (8), the thinner upper portion (30) is placed in position by way of three pieces through a manway. There is a long center piece and two small corner pieces. These pieces are placed into position in channel (28) with the thinner upper portion (30) having still even a thinner portion (30a) to facilitate installation in channel (28). A shim (32) is employed in the channel (28) to firmly hold the upper portion (30) in place. The upper portion (30) is then strength welded to the lower portion (24) with a full penetration weld (34) for strength across the entire length. A space or gap (36) is left at each end of the divider plate (22) to provide a floating design which compensates for the thermal and pressure induced dilation of the primary head (10) and the tubesheet (8). The primary head (10) dilates due to thermal and pressure effects while the tubesheet (8) has a tendency to bulge in the middle due to pressure. The flat construction one-piece floating welded divider plate (22) is designed for the bending moment which has been found to be less away from mid-span. This explains why the lower portion (24) is approximately 50 millimeters (mm) thick while the upper portion (30) is approximately 32 mm thick with the materials being made from carbon steel. The problems of erosion still affect the one-piece floating welded divider plate. Also, the primary divider plate (22) shown in FIG. 3 is not suitable for retrofit or replacement when it becomes necessary to replace the primary divider plate due to erosion. Erosion is less of a concern with a single piece design because there is much less leak path length than for the segmented design. One of the advantages of a single piece design is that there are no loose parts which can cause damage.

There is still a need for a primary divider plate which is suitable for retrofit in existing steam generators. Preferably, this retrofitable primary divider plate would be a floating design and be constructed to reduce the amount of material and welding. Reducing field welding is important in order to minimize radiation exposure to personnel and to minimize distortion due to field welding. Also, the replacement primary divider plate would have an increase in the load carrying capacity with an improved rim to limit the amount that the boundary moves and have no loose parts.

SUMMARY OF THE INVENTION

The present invention is directed to solving the aforementioned problems as well as others by providing a curved one-piece floating primary divider plate that is suitable for retrofit in existing steam generators. The term "curved" is meant to include cylindrical, dished or any other contoured shapes.

One aspect of the present invention is to provide a method for retrofitting a primary divider plate in a steam generator.

Another aspect of the present invention is to provide a curved primary divider plate having a floating design with an improved shape to reduce the amount of material and welding necessary for installation. The curved or dish shape design of the primary divider plate according to the present invention provides an increase in load carrying capacity and reduces the amount of material and welding necessary. The design includes a rim which limits the amount of divider plate deflection under differential pressure load.

The floating one-piece curved replacement divider plate eliminates loose parts, reduces erosion, and lessens leakage concerns.

A further aspect of the present invention is to provide a floating one-piece curved replacement divider plate which is simple in design, rugged in construction, and economical to manufacture.

The various features of novelty characterizing the invention are pointed out with particularity in the claims annexed to and forming a part of this disclosure. For a better understanding of the invention, the operating advantages attained by its uses, reference is made to the accompanying drawings and descriptive matter in which a preferred embodiment of the invention is illustrated.

DESCRIPTION OF THE PREFERRED EMBODIMENTS

Figure 1:
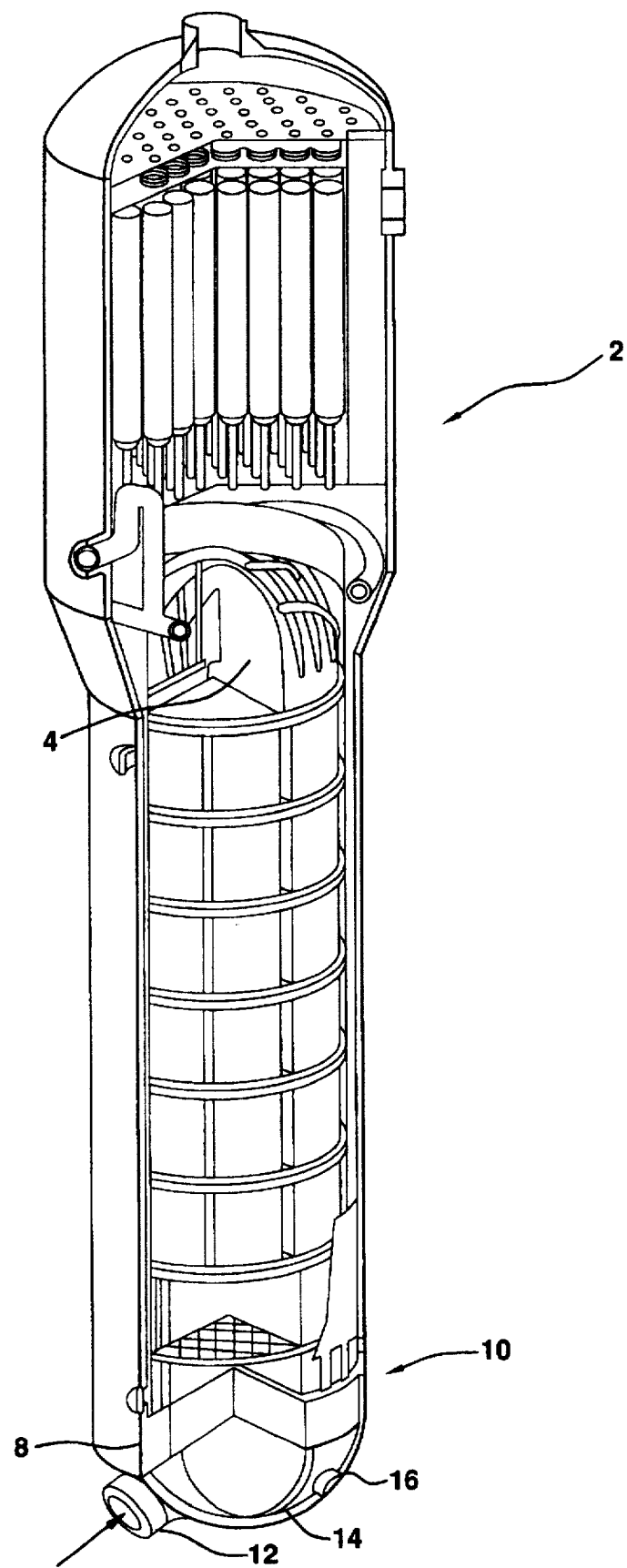
FIG. 1 is an elevated perspective view of a steam generator with portions removed.
Figure 2:
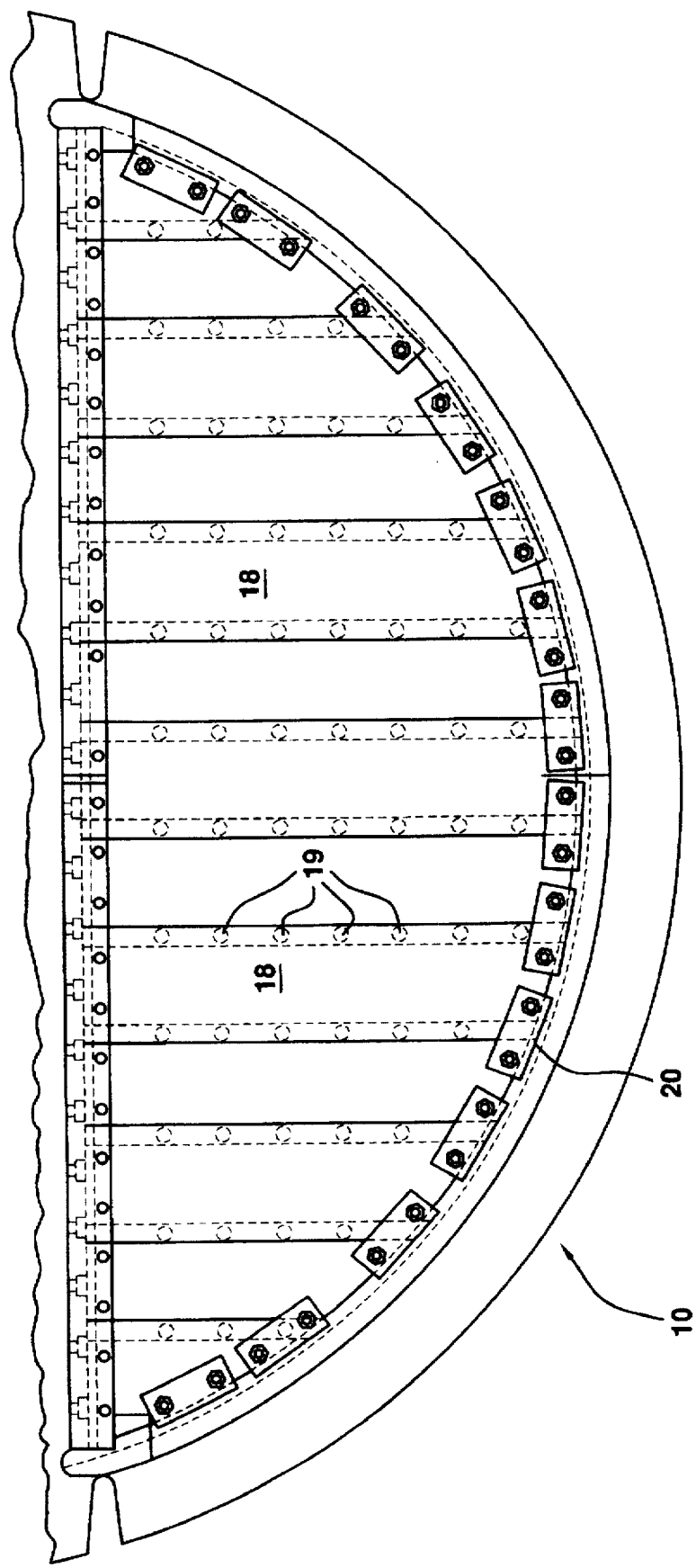
FIG. 2 is a frontal sectional view of the primary head of the steam generator showing a segmented divider plate.
Figure 3:
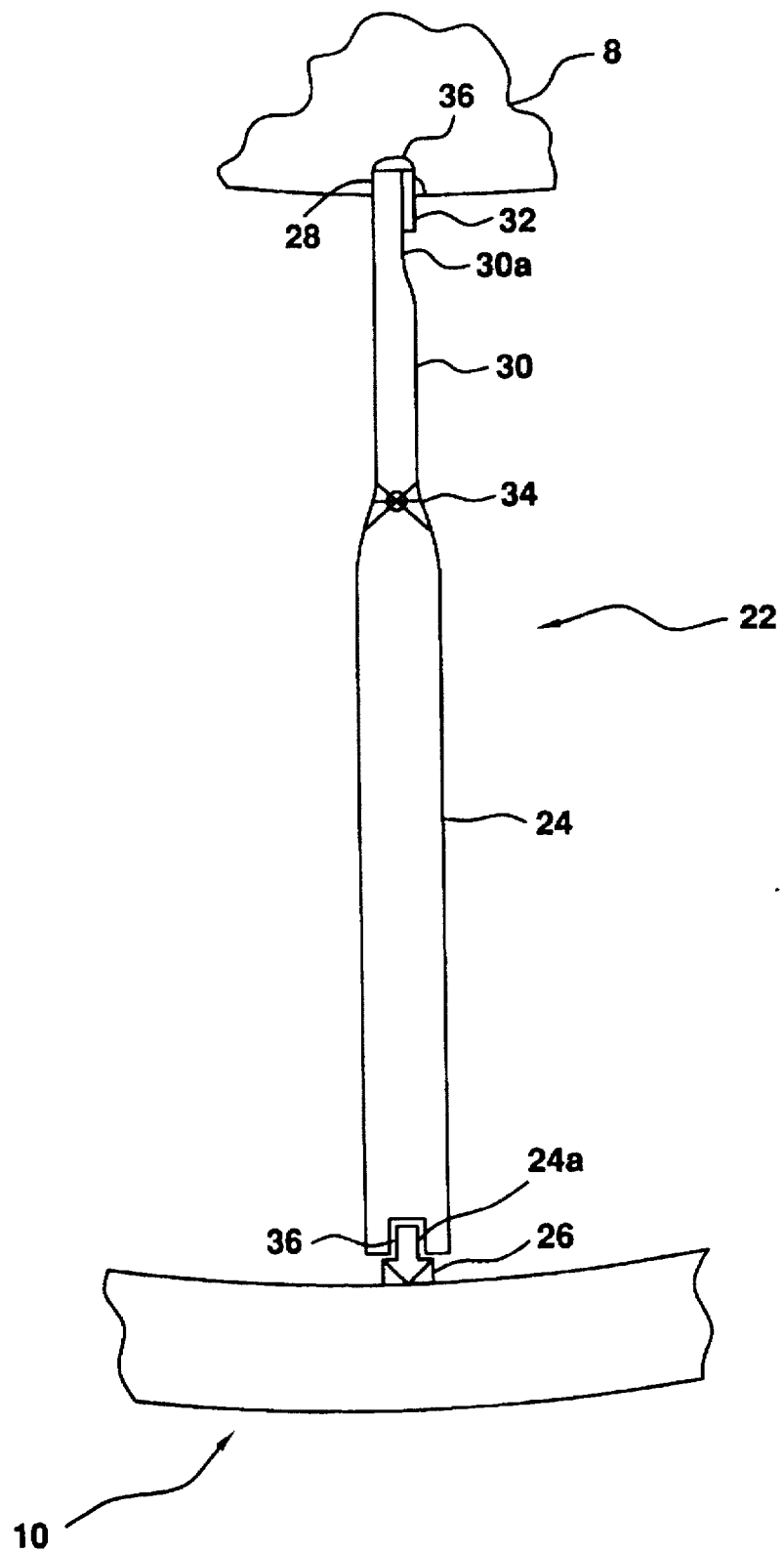
FIG. 3 is a cross sectional view of a one-piece flat construction divider plate.
Figure 4:
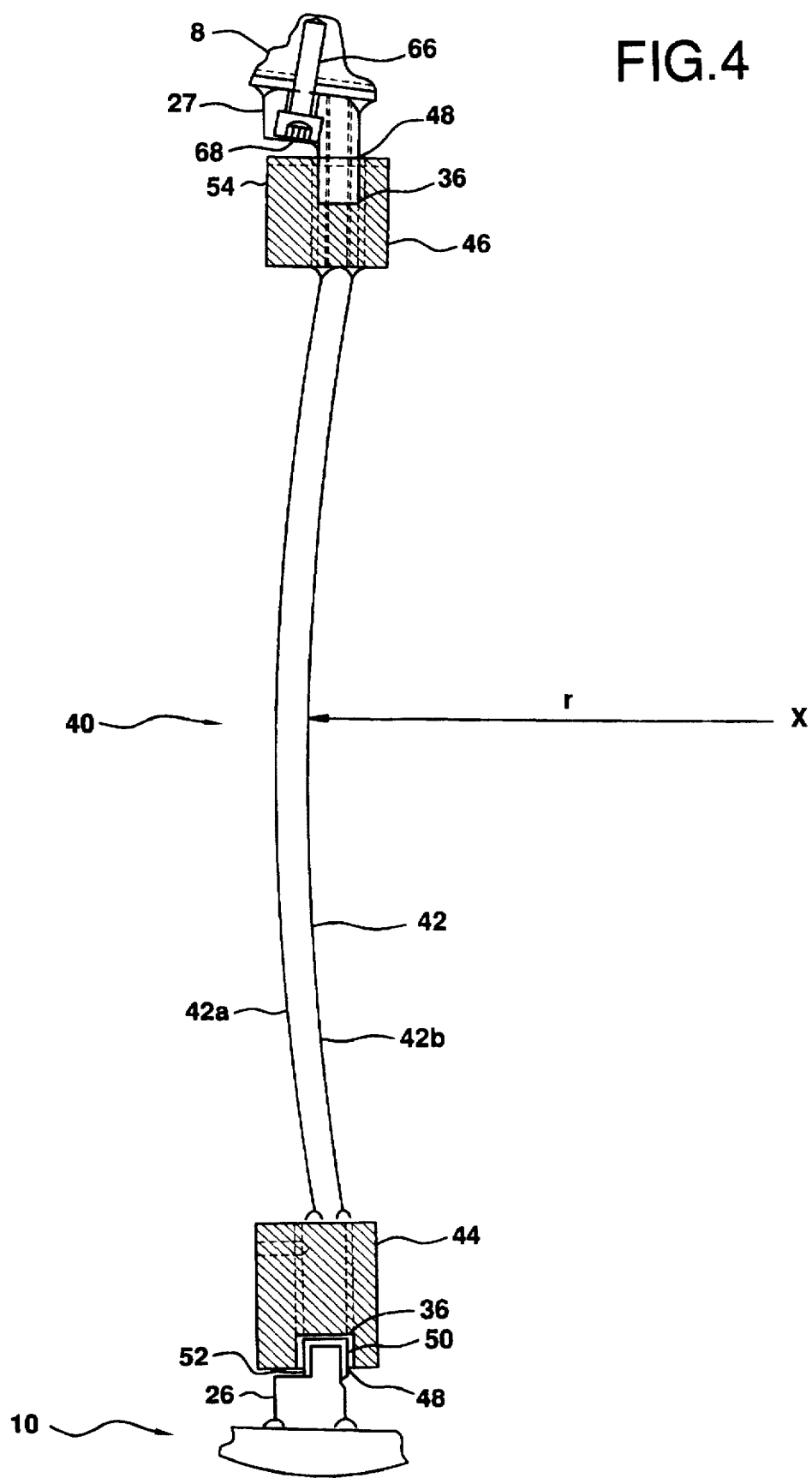
FIG. 4 is a cross sectional view of a one-piece floating curved divider plate according to the present invention.

Referring to the figures generally, where like numerals designate like or similar features throughout the several drawings, and first to FIG. 4 in particular, there is shown the one-piece floating replacement divider plate (40) with a curved design according to the preferred embodiment of the present invention. The curved floating one-piece replacement divider plate (40) includes a curved plate (42) which is preferably about ¾ inch thick connected to a rim (44, 46) at each end which is preferably about 3 inches thick. The curved plate (42) is selected to provide an increase in load carrying capacity and to reduce the amount of material and welding necessary. This results in a thinner divider plate reducing the weight of the plate, reducing the volume of welding required for field installation and reducing distortion due to field welds. The rims (44, 46) have a continuous groove or channel (48) around its perimeter to form a tongue and groove joint with the primary head seat bar (26) and the tubesheet seat bar 27. FIG. 4 shows a seat bar (26) on the primary head wall side as well as a seat bar (27) on the tubesheet (8) side. It is understood that the curved floating one-piece replacement divider plate according to the present invention in an alternate embodiment may be constructed at the tubesheet side to fit within a channel (28) as shown in FIG. 3. The side walls (50) of the groove (48) are preferably clad with an inconel or nickel chrome iron such as Alloy 82 to improve the erosion performance of the tongue-in-groove joint. Preferably, a liner (52) which is also made of an inconel such as Alloy 690 is installed over and welded to the existing primary head seat bar (26). The liner (52) provides a controlled gap (36) in the tongue-in-groove joint between the rims (44,46) and the seat bars (26, 27) which limit leakage and minimizes seat bar erosion. The term "floating" means that the divider plate (40) is not ridgidly attached to the tubesheet (8) or the primary head (10), but allows relative motion to be absorbed by the tongue-in-groove connection around the periphery and across the tubesheet between the seat bars (26, 27) and the rims (44,46). Rim (46) at certain locations where vertical welds occur has a backing bar channel (54) inserted into the groove (48) so when the sections are assembled as later described inside the primary head the vertical weld won't attach the seat bar (27) to the rim (46). Preferably, the backing bar (54) is also made from inconel.

When assembled, the one piece curved floating replacement divider plate according to the present invention has a radius of curvature (r) ranging from approximately 74 to 100 inches with a preferred radius of curvature of about 80 inches. The curved replacement primary divider plate according to the present invention has an edge of curve portion that is within the thickness of the rim to allow approximately ½ inch for the fillet of the weld.

Figure 5:
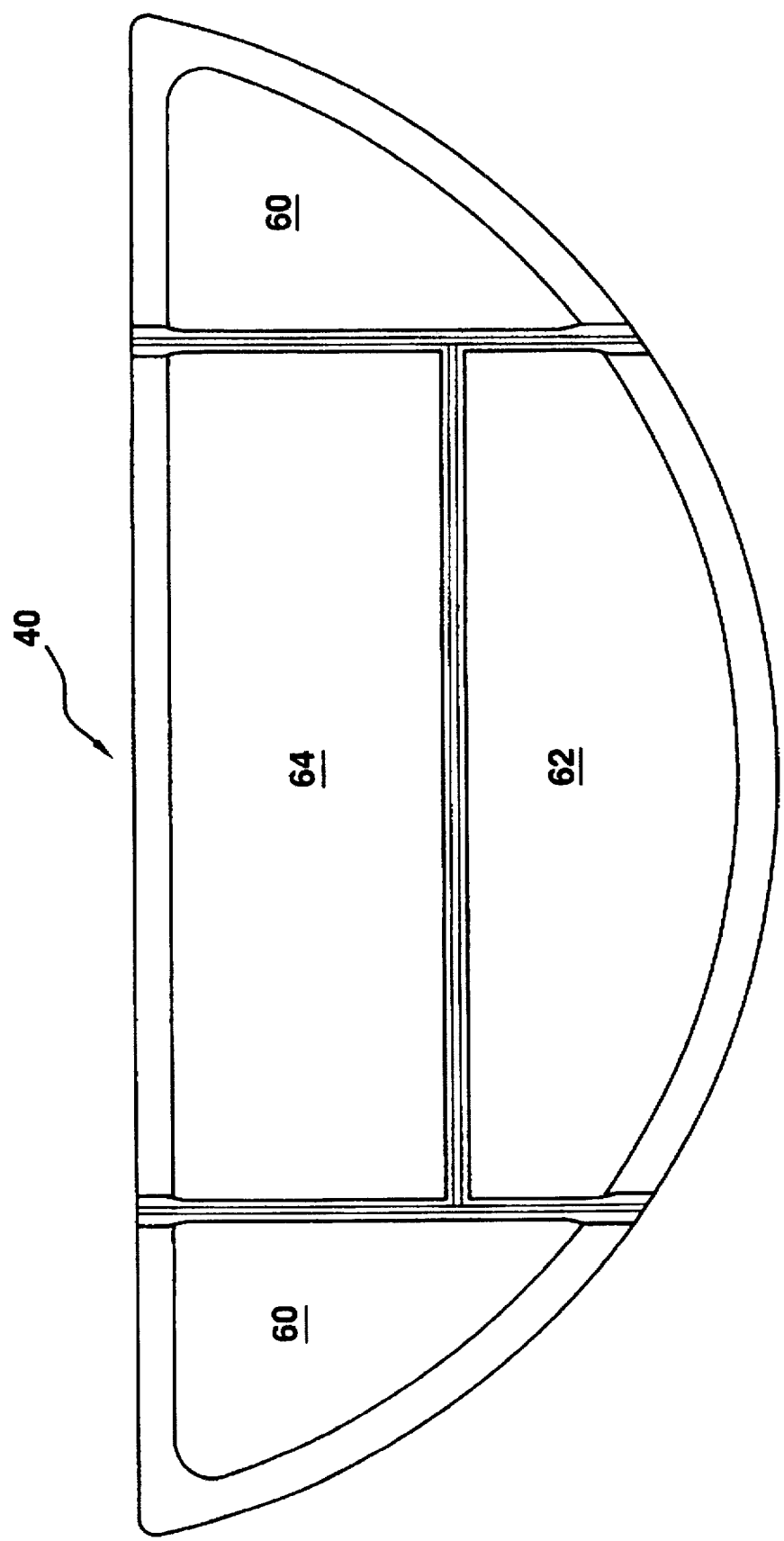
FIG. 5 is a frontal sectional view showing the replacement divider plate in four sections.

Referring now to FIG. 5, there is shown the curved floating primary divider plate (40) in four sections for insertion in a manway with the full and final assembly of the replacement divider plate occurring within the cavity of the primary head (10). The corner sections (60) are inserted first through a manway into the cavity that is defined by the primary head. Next, the lower section (62) is inserted through the manway and placed into position. Normally a steam generator has at least two manways or openings for access into the primary head. Finally, the last section (64) is manipulated into position through the manway. A winch and pulley assembly inside the cavity of the primary head is employed to help manipulate the sections (60, 62, 64) into position since they are heavy. Once the sections (60, 62, 64) are placed into position as shown in FIG. 5 with the curved portion of the plate (42a) facing the inlet side of the primary head and the outlet side being identified as (42b). All of the sections (60, 62, 64) are tack welded into position for final welding. As shown in FIG. 5, there is one horizontal weld between sections (62) and (64) which will require as many as eight welding passes which are preferably performed simultaneously and parallel on both sides to minimize distortion. Similarly, there are two welds shown connecting the corner pieces (60) to sections (62), (64). Since the sections are full strength welded, the vertical welds can preferably require as many as eight passes. These sections are also welded progressively on both sides and as simultaneously as possible and in parallel to minimize distortion. This is not to say that they must be welded synchronously. The weld is continued through the rim as a partial penetration weld with the backing bar channel (54) provided as a safeguard so that no part of the rim is welded to the seat bar.

Preferably, in retrofitting the primary divider plate according to the present invention the old tubesheet seat bar (27)

is removed and replaced with a new inconel seat bar provided in two pieces such as Alloy 690. Temporary fasteners (66) are used for alignment. The tubesheet seat bar (27) is then welded with partial penetration welds to the tubesheet with a locking plate (68) being welded to cover the head of the fastener (66) to ensure that it does not loosen and fall out. Alternately, the existing tubesheet seat bar may be repaired by addition of a liner similar to the head seat bar liner.

Figure 6:
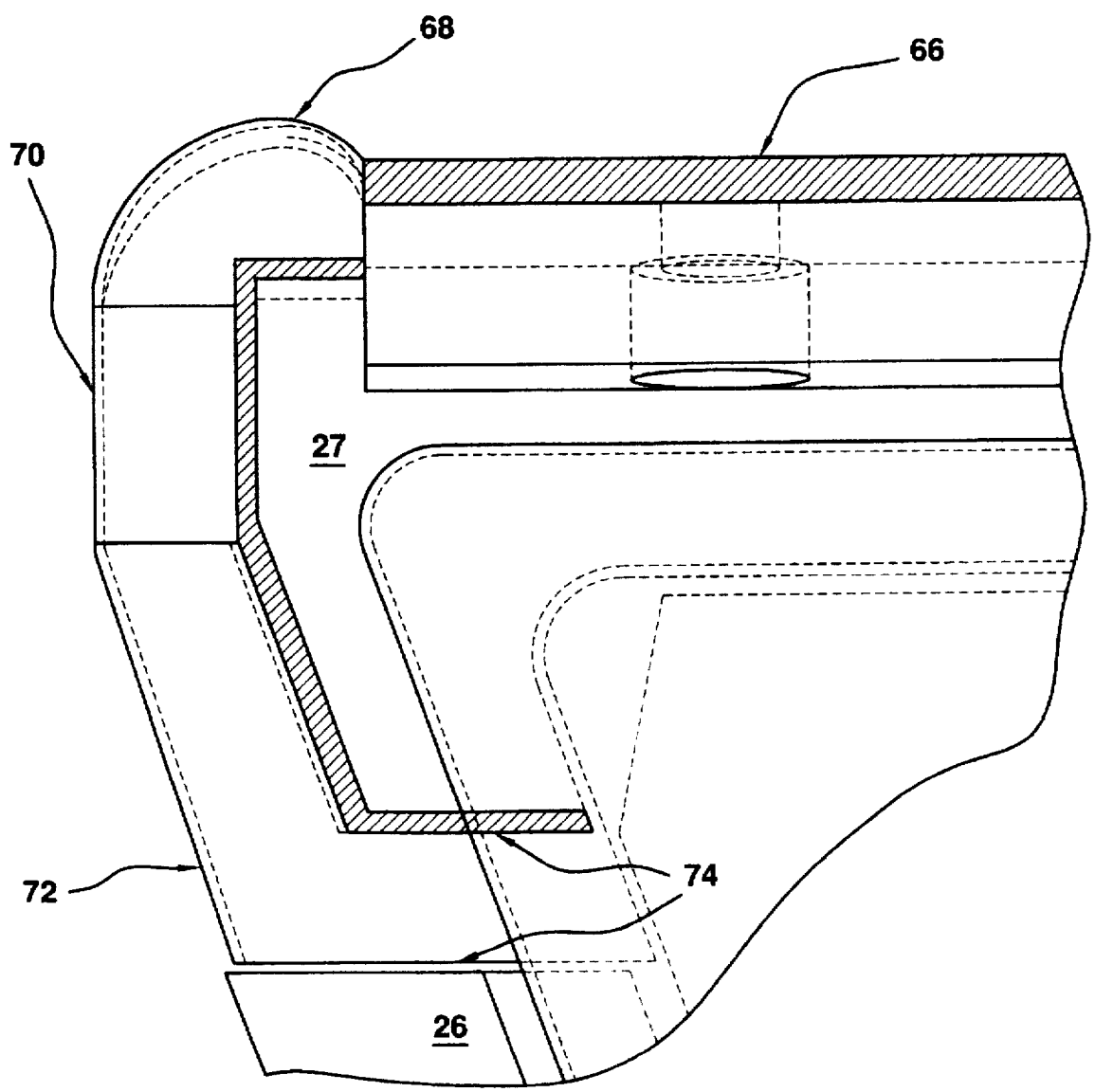
FIG. 6 is an enlarged view similar to FIG. 5 illustrating the corner seal bars.

Next, referring to FIG. 6, there is shown a view illustrating the corner seal bar details. In each corner, there is an upper seal bar (68), a middle seal bar (70), and a lower seal bar (72) that are used to complete the periphery and fill in a gap that is created between the extended "ear" portion of the tubesheet seat bar (27), the primary head (10) and the primary head seat bar (26). Seal bars are fitted on both sides of each ear for a total of four locations. The corner seal bars (68), (70) and (72) are welded into place on the tubesheet seat bar ear (27) so as to provide a seal to minimize any leakage from the primary head inlet to the primary head outlet at the corners. The seal bar welds (74) are flush in the areas shown so as not to interfere with the divider plate fit or operation. In this way, a rugged robust divider plate is employed without the fatigue concerns of the other divider plate designs.

As mentioned earlier, primary flow that leaks through the divider plate bypasses the heat-transfer of the tube-bundle and reduces the thermal performance of the steam generators.

After all of the welding is completed for the one-piece floating curved divider plate, the preferred radius of curvature of approximately 80 inches has an acceptable tolerance range within approximately a ⅛ inch band.

The present invention has found that a replacement primary divider plate may be retrofitted into an existing steam generator using the method of the present invention and preferably the unique curved one-piece floating divider plate. From the foregoing, a flat constructed divider plate may also be retrofitted with the four section method of the present invention. The composition of the materials preferably is that the divider plate is carbon steel with the seat bar liners preferably being inconel. The corner seal plates are also preferably made of an inconel metal.

The floating one-piece curved divider plate and seat bars are designed to withstand maximum pressure differential of about 60 psi during normal operating and upset conditions. The welds of the tubesheet seat bar (27) are designed to withstand a static differential loading of approximately 120 psi.

The one-piece curved floating divider plate according to the present invention provides the most effective solution to divider plate issues with the least risk of future problems due to erosion, leakage and problems with loose parts causing damage inside the primary head or even worse outside the steam generator. The method according to the present invention provides a means for making the primary divider plate suitable for retrofitting in existing steam generators.

While specific embodiments of the invention have been shown and described in detail to illustrate the application and principles of the invention, certain modifications and improvements will occur to those skilled in the art upon reading the foregoing description. It is thus understood that such modifications and improvements have been deleted herein for the sake of conciseness and readability but are properly within the scope of the following claims.

We claim:

1. A primary divider plate for a steam generator, comprising:

a curved plate constructed to extend across a cavity within a primary head of the steam generator, said curved plate having a rim around its periphery, said rim having a groove positioned therein and being constructed to engage seating means within the steam generator, said curved plate including corner sealing means for minimizing leakage in the primary head of the steam generator, said corner sealing means including an upper seal bar, a middle seal bar, and a lower seal bar at each side of each tubesheet seat bar ear in the region of the upper corners of the primary divider plate.

2. A primary divider plate as recited in claim 1, wherein said groove in said rim comprises a weld clad therein for resisting erosion.

3. A primary divider plate as recited in claim 1, wherein said curved plate has a radius of curvature ranging from approximately 74 to 100 inches.

4. A primary divider plate as recited in claim 3, wherein said radius of curvature is approximately 80 inches.

5. A primary divider plate as recited in claim 1, wherein said curved plate is about ¾ inch thick.

6. A primary divider plate as recited in claim 1, wherein said seating means comprises seat bars positioned within the steam generator.

7. A primary divider plate as recited in claim 1, wherein said rim is about 3 inches thick.

8. A primary divider plate as recited in claim 1, wherein said rim is thicker than said curved plate.

9. A primary divider plate for a steam generator, comprising:

a curved plate constructed to extend across a cavity within a primary head of the steam generator, said curved plate having a rim around its periphery, said rim being constructed to engage seating means within the steam generator, said curved plate including corner sealing means for minimizing leakage in the primary head of the steam generator, said corner sealing means including an upper seal bar, a middle seal bar, and a lower seal bar at each side of each tubesheet seat bar ear in the region of the upper corners of the primary divider plate.

* * * * *